United States Patent
Shashanka et al.

(10) Patent No.: US 12,375,517 B1
(45) Date of Patent: Jul. 29, 2025

(54) METHODS AND SYSTEMS FOR IDENTIFYING ANOMALOUS USERS EXHIBITING OVERREACHING ACCESS PERMISSIONS TO DATA OBJECTS

(71) Applicant: Concentric Software, Inc, San Mateo, CA (US)

(72) Inventors: Madhusudana Shashanka, Austin, TX (US); Sumeet Khirwal, Jamshedpur (IN)

(73) Assignee: CONCENTRIC SOFTWARE, INC, San Mateo, CA (US)

( * ) Notice: Subject to any disclaimer, the term of this patent is extended or adjusted under 35 U.S.C. 154(b) by 0 days.

(21) Appl. No.: 19/031,089

(22) Filed: Jan. 17, 2025

(51) Int. Cl.
*H04L 9/40* (2022.01)

(52) U.S. Cl.
CPC ........ *H04L 63/1425* (2013.01); *H04L 63/102* (2013.01); *H04L 63/1416* (2013.01)

(58) Field of Classification Search
CPC  H04L 63/1425; H04L 63/102; H04L 63/1416
USPC ......................................................... 726/22
See application file for complete search history.

(56) References Cited

U.S. PATENT DOCUMENTS

| | | | | |
|---|---|---|---|---|
| 7,941,851 | B2* | 5/2011 | Shahar | H04L 63/1483 713/188 |
| 2014/0196104 | A1* | 7/2014 | Chari | H04L 63/102 726/1 |
| 2023/0179604 | A1* | 6/2023 | Adcock | H04L 63/101 726/4 |
| 2023/0199025 | A1* | 6/2023 | Xu | G06F 21/55 726/22 |
| 2024/0129324 | A1* | 4/2024 | Thimmareddy | H04L 63/1416 |

* cited by examiner

*Primary Examiner* — Badri Narayanan Champakesan
(74) *Attorney, Agent, or Firm* — Evergreen Valley Law Group; Kanika Radhakrishnan

(57) ABSTRACT

Methods and systems for identifying anomalous users exhibiting overreaching access permissions to data objects. The method includes determining access permission data for each of a plurality of users. Each of the plurality of data objects corresponds to one of a plurality of categories. The method includes determining first score data for each user of the plurality of users based on the access permission data associated with each of the plurality of users. The method includes computing a threshold value of the first score data defining a boundary value of the first score datafor identification of the anomalous users. The method includes identifying a subset of users, among the plurality of users, as the anomalous users exhibiting overreaching access permission. The first score data for each of the subset of usersis equal to or below the computed threshold value.

15 Claims, 7 Drawing Sheets

METHODS AND SYSTEMS FOR IDENTIFYING ANOMALOUS USERS EXHIBITING OVERREACHING ACCESS PERMISSIONS TO DATA OBJECTS

TECHNICAL FIELD

The present invention relates to enterprise security management and more particularly to methods and systems for identifying anomalous users exhibiting overreaching access permissions to data objectsin large enterprises.

BACKGROUND

Enterprises typically rely on security groups to manage and control access to sensitive documents, files, and other resources. These security groups often correspond to specific departments, roles, or functions within the enterprise. These groups are then assigned permissions to access certain sets of documents or resources, ensuring that all members of the group have the necessary access to perform their roles. This method simplifies access control by allowing administrators to manage permissions at the group level, rather than for each individual user.

However, as enterprises grow, the number of security groups can proliferate, increasing the complexity of managing access rights and ensuring the proper protection of sensitive information. The proliferation of redundant groups increases the threat surface. The ever-increasing volume of documents generated within enterprises presents a significant challenge for security teams. In medium to large enterprises, it is not uncommon to find tens of thousands of security groups, each with varying degrees of access to resources. One of the primary challenges in managing security groups is the potential impact on business continuity when changes are made. Removing users from security groups or eliminating groups can disrupt access to critical resources, hindering employees from performing their job functions. This risk makes enterprises cautious about modifying or streamlining group configurations, even when outdated or redundant groups are identified.

The accumulation of security groups, many of which may be obsolete or grant excessive or unnecessary permissions, introduces significant security risks for enterprises. Permissions are frequently granted in an ad hoc manner, with little consideration for ongoing validation or periodic review. As users gain access to resources beyond what is required for their roles, the enterprisebecomes more vulnerable to security threats. It provides malicious entities with more opportunities to exploit excessive or unmonitored permissions, potentially leading to unauthorized access, data breaches, and other security incidents.

Detecting excessive or unnecessary user permissions requires identifying over-permissioned users. However, this process is particularly challenging due to the lack of a definitive standard for what constitutes the correct permissions for each user. In large-scale environments, manually determining the precise set of appropriate permissions for every user is neither practical nor feasible. Without a well-defined benchmark for appropriate access levels, it becomes difficult to accurately assess whether a user has been granted excessive or unnecessary permissions.

Hence, there exists a technological need for more effective mechanisms to identify anomalous users exhibiting overreaching access permissions to data objects within large enterprises and to take appropriate actions to mitigate the risk exposure of the enterprise. This approach aims to address this gap by providing methodologies to identify users who are likely over-permissioned.

SUMMARY

Various embodiments of the present disclosure provide methods and systems for identifying anomalous users exhibiting overreaching access permissions to data objects in large enterprises.

In an embodiment, a computer-implemented method is disclosed. The computer-implemented method performed by a server system includes determining access permission data for each of a plurality of users. The access permission data for each user indicates a set of data objects, among a plurality of data objects, accessible to the corresponding user. Each of the plurality of data objects corresponds to one of a plurality of categories. The method includes determining first score data for each user of the plurality of users based on the access permission data associated with each of the plurality of users. The first score data indicates a degree of closeness between the access permission data of the corresponding user and an expected access permission data of the corresponding user. The determining the first score data comprises determining second score data for the corresponding user for each of the plurality of categories based on the access permission data and determining the first score data for the corresponding user based at least on the determined second score data for each of the plurality of categories. The method includes computing a threshold value of the first score data defining a boundary value of the first score data for identification of the anomalous users. The method includes identifying a subset of users, among the plurality of users, as the anomalous users exhibiting overreaching access permission. The first score data for each of the subset of usersis equal to or below the computed threshold value.

In another embodiment, a server system is disclosed. The server system includes a memory configured to store instructions, a communication interface, and a processor configured to execute the instructions stored in the memory and thereby causing the server system to determine access permission data for each of a plurality of users. The access permission data for each user indicates a set of data objects, among a plurality of data objects, accessible to the corresponding user. Each of the plurality of data objects corresponds to one of a plurality of categories. The server system is also caused to determine first score data for each user of the plurality of users based on the access permission data associated with each of the plurality of users. The first score data indicates a degree of closeness between the access permission data of the corresponding user and an expected access permission data of the corresponding user. To determine the first score data, the server system is also caused to determine second score data for the corresponding user for each of the plurality of categories based on the access permission data and determine the first score data for the corresponding user based at least on the determined second score data for each of the plurality of categories. The server system is also caused to compute a threshold value of the first score data defining a boundary value of the first score data for identification of the anomalous users. The server system is also caused to identify a subset of users, among the plurality of users, as the anomalous users exhibiting overreaching access permission. The first score data for each of the subset of usersis equal to or below the computed threshold value.

In yet another embodiment, a non-transitory computer-readable storage medium is disclosed. The non-transitory computer-readable storage medium comprises computer-executable instructions that, when executed by at least a processor of a system, cause the system to perform a method. The method includes determining access permission data for each of a plurality of users. The access permission data for each user indicates a set of data objects, among a plurality of data objects, accessible to the corresponding user. Each of the plurality of data objects corresponds to one of a plurality of categories. The method includes determining first score data for each user of the plurality of users based on the access permission data associated with each of the plurality of users. The first score data indicates a degree of closeness between the access permission data of the corresponding user and an expected access permission data of the corresponding user. The determining the first score data comprises determining second score data for the corresponding user for each of the plurality of categories based on the access permission data and determining the first score data for the corresponding user based at least on the determined second score data for each of the plurality of categories. The method includes computing a threshold value of the first score data defining a boundary value of the first score data for identification of the anomalous users. The method includes identifying a subset of users, among the plurality of users, as the anomalous users exhibiting overreaching access permission. The first score data for each of the subset of usersis equal to or below the computed threshold value.

BRIEF DESCRIPTION OF THE FIGURES

For a more complete understanding of example embodiments of the present technology, reference is now made to the following descriptions taken in connection with the accompanying drawings in which.

Figure 1:
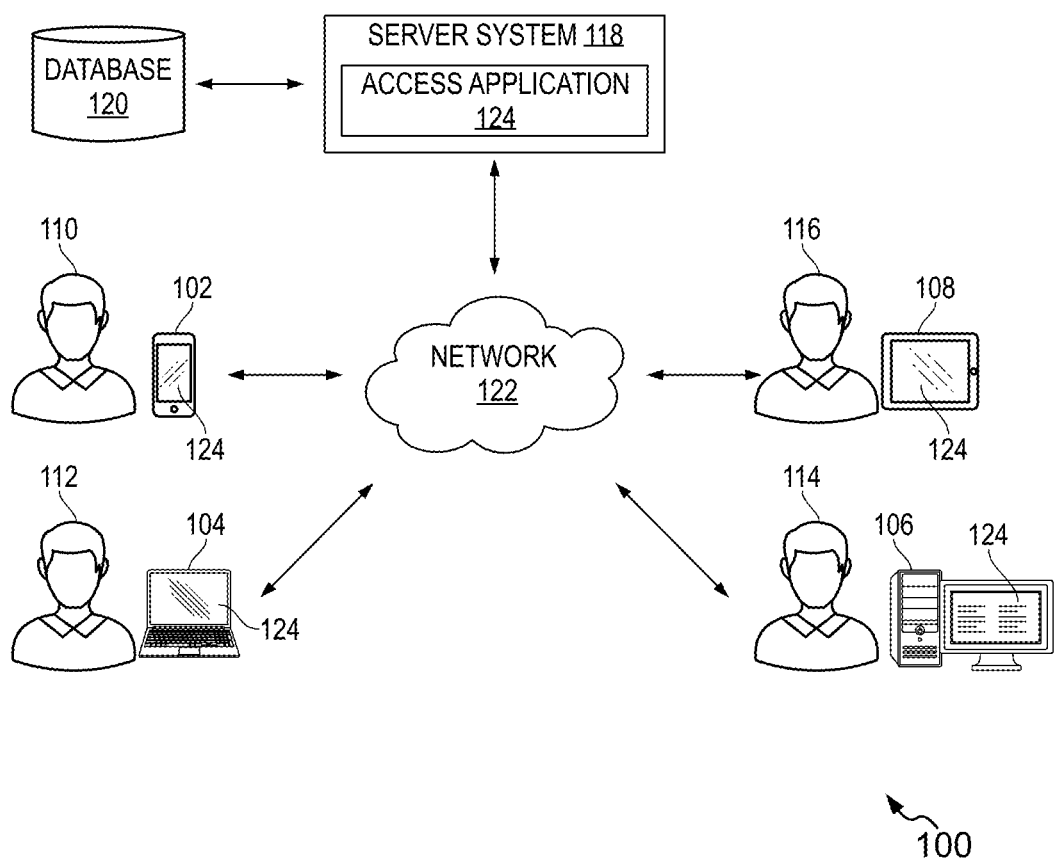
FIG. 1 is an example representation of an environmentrelated to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "data object", "document", "file", and "electronic document" may have been used interchangeably throughout the description. Unless the context suggests otherwise, these terms refer to a digital file that contains information formatted for electronic storage, retrieval, and display on various output devices such as computer, etc.

The terms "over-permissioned users" and "anomalous users" may have been used interchangeably throughout the description. Unless the context suggests otherwise, these terms refer to users within a system who have been granted access permissions that exceed what is necessary for their roles. These users may have access to more data objects, systems, or functionalities than required, posing a security risk due to unnecessary exposure to sensitive information or critical systems.

Unless the context suggests otherwise, the term "expected access permission data" refers to a set of access permissions designated for a user based on their role, responsibilities, or organizational policy. This data outlines the intended level and scope of access rights that a user should ideally have within a system, serving as a benchmark or standard against which a user's actual access permissions can be evaluated.

Unless the context suggests otherwise, the term "group membership" refers to the association or inclusion of an entity, such as a user or a group within another group. This group is typically governed by common characteristics, access permissions, roles, or responsibilities, allowing for collective management, access control, or interaction within a specified domain.

Overview

Various example embodiments of the present disclosure provide methods and systems for identifying anomalous users exhibiting overreaching access permissions to data objects in large enterprises. In particular, a unique approach is proposed for identifying anomalous users exhibiting overreaching access permissions to data objects. The proposed methods and systems perform statistical analysis of the access information associated with the users and identify the users having overreaching user permissions. In this process, the system analyzes each category to which documents are associated to identify overly permissive users to reduce the risk of unauthorized access and data breaches.

Upon identification of the anomalous users, the system can execute appropriate actions to reduce the risk of unauthorized access within the organization. For example, the system may analyze the existing grouping structure and composition of security groups and their associated permissions within an enterprise, identifying redundant, obsolete, or overly access permission and generating a new set of groups i.e. optimizing the existing groups for efficient access control.

Various embodiments of the present disclosure offer multiple advantages and technical effects. For instance, the proposed invention offers several significant advantages, particularly in the context of risk management and access control of files within an enterprise. One of the primary benefits is the ability to identify the users associated with overreaching access permissions, so that enterprises can compute the risk of unauthorized access to the documents within the organization. This capability allows organizations to pinpoint areas where access privileges may be excessive, thereby reducing the risk of unauthorized access to sensitive documents and resources. By identifying users with overreaching permissions, enterprises are better equipped to take corrective actions and limit exposure to potential security breaches.

Traditional access control mechanisms often fail to account for the accumulation of permissions over time, leaving gaps in the security framework. The proposed invention offers a solution by enabling enterprises to actively monitor and assess permission structures. By providing insights into the over-permissioning of users, organizations can compute the likelihood of unauthorized access or misuse, allowing for more informed risk mitigation strategies. This, in turn, enhances the overall security and integrity of enterprise systems.

Furthermore, the invention provides access to sensitive information to be limited to authorized personnel. By systematically identifying and rectifying cases of excessive access, the proposed system helps organizations to achieve a more efficient and secure management of user permissions, allowing organizations to maintain a tighter control over their access control systems.

Various embodiments of the methods and systems for identifying anomalous users exhibiting overreaching access permissions to data objects are described hereinafter with reference to FIG. 1 to FIG. 7.

FIG. 1 is an example representation of an environment 100 related to at least some examples of the present disclosure. Although the environment 100 is presented in one arrangement, other embodiments may include the parts of the environment 100 (or other parts) arranged otherwise depending on, for example, the way in which a server system 118 (interchangeably referred to as "system 118") facilitates identifying the user exhibiting excessive access permissions for enhanced and secured access control within the enterprise. The example representation of the environment 100 generally includes a plurality of user devices 102, 104, 106, and 108 associated with a plurality of users 110, 112, 114, and 116, respectively, a server system 118, and a database 120 connected to, and in communication with (and/or with access to) a wireless communication network (e.g., a network 122). The plurality of users are associated with an enterprise.

In the illustrated environment 100, the plurality of user devices 102-108 are depicted as a mobile phone, a laptop, a desktop computer, and a tablet respectively. However, the plurality of user devices 102-108 may include any other suitable electronic or computing device as well. For instance, the computing device may be, for example, a smartphone, a personal computer, an electronic tablet, a wearable device, a smart device such as a smart TV or smart appliance, etc.

In one example, the plurality of users 110-116 may access a set of data objects such as documents or files through the associated user devices 102-108. The server system 118 allows the plurality of users 110-116 to input user credentials for authorizing the user to access the set of data objects. The server system 118 may act as a central authority responsible for managing access to these resources. In this case, two-step authorization can be performed. In the first step, each user must provide their credentials (such as usernames, passwords, or other authentication methods). The server system 118 checks these credentials to authenticate the user's identity. Once the users 110-116 are authorized, the server system 118 moves on to a second step to determine the access permissions granted to the users 110-116. These permissions define what each user can do within the system, such as viewing, editing, or downloading specific documents or files. The system 118 assesses the user's profile, group membership, or other authorization parameters to decide whether the user is permitted to access the requested data objects. This process ensures that the authenticated users are allowed to perform the correct actions based on predefined rules set by administrators.

Based on the access permissions, if the user's access permissions meet the required level for the documents or data they are trying to access, the system 118 grants access, allowing the user to proceed with viewing or interacting with the files. However, if the permissions are insufficient—for instance, if the user is not part of a security group that has access to the requested files, the system118 denies the request. This denial ensures that unauthorized users cannot reach restricted or sensitive data, reinforcing the organization's security policies.

In another embodiment, the server system 118 responsible for identifying users with excessive access permissions can work in tandem with an access control server (not shown) that manages and controls actual access to data objects, such as documents or files. In this case, the server system 118 focuses on analyzing the information associated with users with associated access permissions and identifying any anomalies or users with access levels that exceed their required permissions. The server system 118 identifies users whose permissions are disproportionate to their roles, referred to as "over-permissioned" or "anomalous" users. Once these users are flagged, appropriate actions can be taken to mitigate the associated risks. Such actions may include the removal of unnecessary permissions, adjustment of existing permissions to align more closely with the users' current roles, or further refining permission structures to maintain an optimal balance between accessibility and security. The server system 118 does not directly grant or deny access butserves as a critical decision-making layer that analyzes and flags potential risks, feeding this information back to the access control server. The access control server is responsible for enforcing the recommended changes, which may involve modifying access rights, removing users from certain permission groups, or making other adjustments as needed to ensure secure and manageable access to enterprise data. By allowing the server system 118 to specialize in risk analysis and user behavior identification while delegating enforcement tasks to the access control server, enterprises can achieve greater control over their access structures.

In this manner, the server system 118 operates seamlessly alongside the access control server to ensure that users' permissions are appropriately managed without causing disruptions to their workflow. Users 110-116 can continue accessing the documents and resources they need for their tasks, while the server system 118 operates efficiently in the background, minimizing risk. This dual focus enhances both security and operational continuity across the enterprise. This entire process occurs seamlessly and in real-time, ensuring that users 110-116 can access necessary resources immediately if authorized, while also preventing unauthorized access. By managing access based on each user's credentials and permissions, the server system 118 ensures both security and efficiency in the handling of sensitive documents, safeguarding the organization's data integrity and compliance with security protocols. However, it will be apparent to a person skilled in the art that all the functionalities described herein for the access control server can be embedded within the server system 118.

It should be noted that the number of users and user devices described herein are only used for exemplary purposes and do not limit the scope of the invention. The main objective of the invention is to identify anomalous users exhibiting overreaching access permissions to data objects in large enterprises.

The server system 118 may be deployed as a standal one server or can be implemented in the cloud as software as a service (SaaS). The server system 118 provides or hosts an access application 124 for enabling the plurality of users 110, 112, 114, and 116 to provide access to the set of data objects within large data object collections. For example, the access application 124 may be a mobile application, a desktop application, a website, or a plugin in a third-party application. For example, the third-party application may be any existing access application facilitating the execution of tasks similar to that performed by the server system 118. In some embodiments, the access application 124 can be implemented as operating system extensions, modules, plugins, and the like. Further, the access application 124 may be operative in a cloud infrastructure, or the access application 124 may be executed within or as a virtual machine (VM) or virtual server that may be managed in the cloud infrastructure.

The server system 118 is embodied in at least one computing device in communication with the network 122 and/or embodied in at least one non-transitory computer-readable media. For example, an instance of the access application124 is accessible to the user devices 102-108, as shown in the environment 100 in FIG. 1. This enables the plurality ofusers 110-116 to be able to access the server system 118 on the user devices 102-108. The access application 124 is a set of computer-executable codes configured to provide user interfaces (UIs) enabling the plurality of users 110-116 to get access to a set of data objects under the two-step authorization for the request to access the data objects. In an embodiment, the server system 118 may provide access to the data objects through the access application 124, in response to a request received from the user devices 102-108 via the network 122. In another embodiment, the access application 124 may be factory-installed on the user devices 102-108.

The network 122 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 122 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, any future communication protocol, or any combination thereof. The network 122 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 122 may include multiple different networks, such as a private network made accessible by the user devices 102-108, the server system 118, and the database 120 separately, and/or a public network (e.g., the Internet) through which the user devices 102-108, the server system 118, and the database 120 may communicate.

In one embodiment, the server system 118 is configured to perform one or more of the operations described herein. In particular, the server system 118 is configured to obtain access data for identifying anomalous users. The access data includes data associated with a plurality of data objects and corresponding access information. The access information specifies a set of users or groups, from the plurality of users or the plurality of groups, authorized to access each respective data object of the plurality of data objects. Thus, the access information specifies a set of users/groups for each data object. The access data refers to the data objects such as documents, files, or systems within the enterprise and the access information associated with each data object. This data helps determine which users or groups have access to specific data objects that users attempt to access such as files, databases, applications, or specific documents within a company's network.

The access data may include access information that specifies which users or groups have permission to access the data object to view, edit, or manage the object. The access information can also include information about how and when users or groups have accessed specific data objects. Access logs are important for tracking user activity and identifying patterns that can help in tracking anomalous activity of the users. Example: John Doe accessed the budget report on July 15, but Jane Smith hasn't accessed any files for 6 months.

The plurality of data objects may be associated with a plurality of categoriesallowing for flexible and granular organization of information. Each category exhibits unique characteristics compared to other categories. Each data object can belong to one or more categories, which can represent various groupings or clusters. The categorization or grouping of objects can be performed based on their semantic meaning. These categories serve to facilitate efficient access and management of the data objects by enabling users to navigate based on thematic or contextual relationships. The system can assign data objects to categories dynamically, ensuring that the organizational structure remains adaptable to evolving user needs and permissions.

In another embodiment, the data object can be categorized based on arbitrary granularity. In this case, data objects are categorized at various levels of detail without being constrained to fixed or predefined categories. This categorization enables the system 118 to assign data objects to categories based on varying degrees of specificity or context. The system 118 can dynamically adjust the granularity depending on the nature of the data and user needs. The categorization allows the system 118 to create categories and clusters that reflect the evolving relationships between data objects, enabling users to retrieve and organize information in a way that best suits their requirements at any given time.

In some embodiment, the server system 118 is configured to obtain user data to which users have access to specific data objects, such as documents or files, through their membership in certain groups. In many enterprise systems, access to resources is often controlled at the group level rather than directly at the individual user level. Users are typically assigned to groups, and these groups are then given permissions to access certain data objects. However, if the access data only indicates the permissions assigned to groups, the system cannot directly determine which individual users have access to which data objects. Therefore, the server system 118 requires user data that specifies the relationship between users 110-116 and the groups they belong to. By obtaining the user data, the system 118 can map users 110-116 to the corresponding groups, and through those groups, determine the access permissions that each user has for specific data objects.

For example, if the access data shows that a group called "Finance Team" has permission to access certain financial documents, but does not list the individual users of that group, the system 118 needs to cross-reference user data to identify which users are part of the "Finance Team." Once the server system 118 retrieves this information, it can establish the link between individual users and the data objects they can access, based on the group's access permissions. This allows the system to accurately assess the access rights of each user, identify any users with excessive permissions, and recommend adjustments to minimize security risks.

The user data may include data associated with a plurality of users and a plurality of groups, where each user is associated with at least one group. In other words, the user data refers to information about the users in the system and the groups to which they belong. The user data also specifies a group membership of each user and a few of the groups as each user belongs to at least one group, however, a group may or may not belong to another group.

The user data typically includes a list of users within the enterprise. This list can include basic information such as user IDs, names, job roles, departments, and possibly their locations. Example: John Doe (user ID 1234), Jane Smith (user ID 5678). Each user is associated with one or more security groups (interchangeably referred to as "groups") and the group can be associated with other groups. The server system 118 collects information on all existing groups within the enterprise, including group names, descriptions, and the users that belong to each group.

The server system 118 may obtain the user data and access data in structured format such as Extensible Markup Language (XML) or JavaScript Object Notation (JSON) format.

In another embodiment, the user data and the access data can be obtained in Comma-separated values (CSV), Structured Query Language (SQL), or Excel format. In an embodiment, the access information may include Access Control Lists (ACLs) that define permissions for each object. An ACL can indicate which users or groups are granted access to certain files.

The user data and the access data can be obtained in various ways. For instance, the server system 118 can be configured to interact with other systems and databases through application programming interfaces (APIs). This integration allows the server to automatically fetch user data and access data from external sources such as enterprise content management systems, cloud storage services, or document repositories. In another example, the server system 118 can fetch the data directly from the database 120. In another example, the server system 118 can employ web crawling techniques to gather data from specific websites or intranets. In another example, the server system 118 can use stream processing to continuously ingest documents from real-time data streams. This approach is suitable for scenarios where documents are generated continuously and need to be processed on-the-fly.

Thus, the server system 118 is configured to obtain the access data, and based on the access data, the server system 118 can be configured to determine access permission data (interchangeably referred to as "user permissions", or "permissions") for each of the plurality of users based at least on the access data. The access permission for each user indicates a set of data objects, among a plurality of data objects, accessible to the corresponding user. In other words, the access permission indicates mapping between each of the plurality of data objects with corresponding associated users of the plurality of users. The system retrieves a comprehensive list of data objects including all files and folders within the enterprise. This helps in understanding the hierarchy and structure of these files, such as folders containing subfolders or documents. For each file or folder, the corresponding access informationis examined. This includes who has access (users and groups) and what type of access they have (read, write, delete).

In an embodiment, the server system 118 may also be configured to obtain and analyze the user data to determine the access permission data for each of the plurality of users. The user data are analyzed to determine group memberships of users and groups to determine the structure of user groups to better understand how users are organized. The group mapping information can indicate the mapping between a group to all users who belong in the group or who belong in groups that belong in that group. The server system 118 may determine how users are linked to groups based on the user data. Example: John Doe is part of the "Finance" group, while Jane Smith is part of the "Engineering" group. The group mapping information unrolls the direct relationship between the users and groups. For example, if group B is a subset of group A, then group mapping information can indicate mapping between the users of both groups A & B with group A, and mapping between users of group B with group B. Thus, based on the access data along with the user data, the server system 118 can determine the access permission data for each user.

Upon determination of the access permission data for each of the plurality of users, the server system 118 may determine a first score data for each user of the plurality of users. The first score data is indicative of a degree of closeness between the access permission data of the corresponding user and an expected access permission data of the corresponding user. Once the first score data for each user is determined, the server system 118 may compute a threshold value of the first score data defining a boundary value of first score data for identification of the anomalous users. The server system 118 may identify a subset of users, among the plurality of users, as anomalous users exhibiting overreaching access permissions such that the first score data for each of the subset of users is equal to or below the computed threshold.

The number and arrangement of systems, devices, and/or networks shown in FIG. 1 are presented as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device is shown in FIG. 1 may be implemented as multiple, distributed systems or devices. In addition, the server system 118 should be understood to be embodied in at least one computing device in communication with the network 122, which may be specifically configured, via executable instructions, to perform steps as described herein, and/or embodied in at least one non-transitory computer-readable media.

Figure 2:
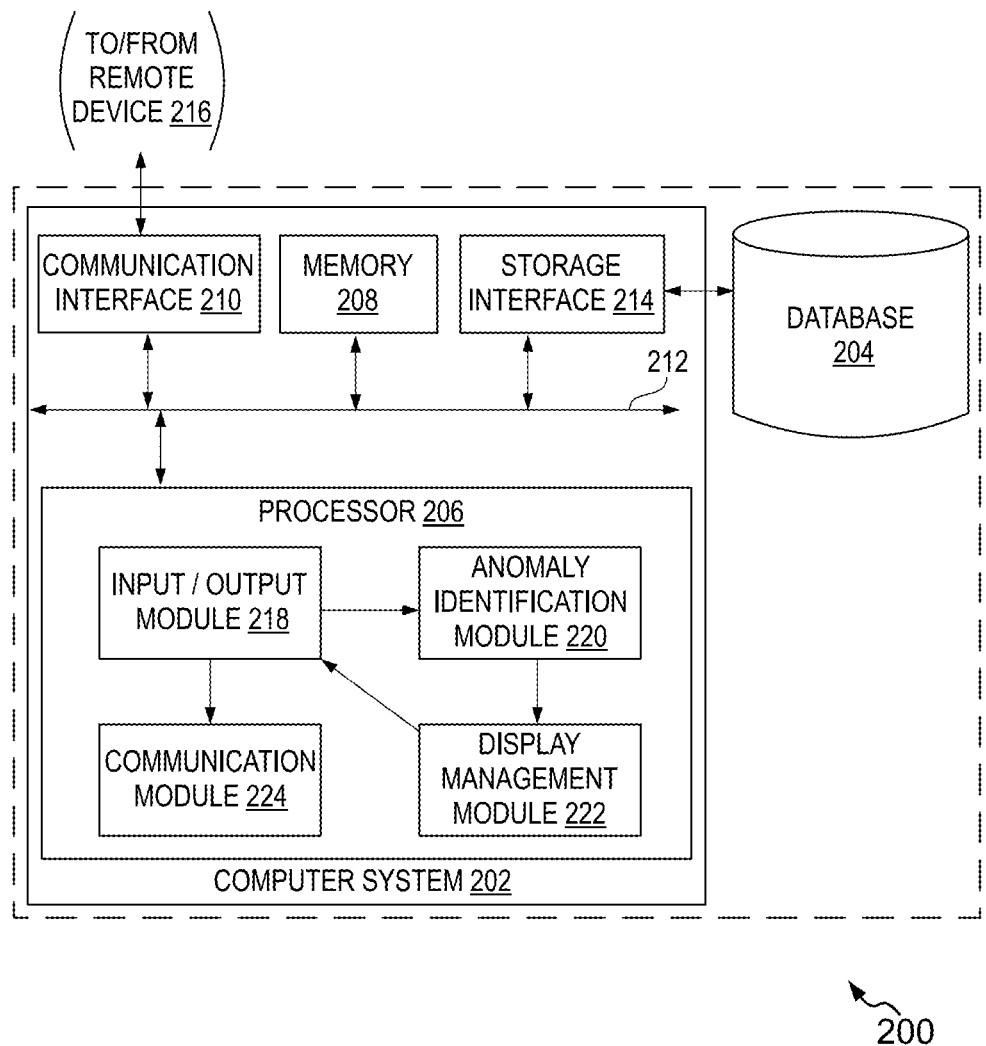
FIG. 2 is a simplified block diagram representation of a server system, in accordance with an embodiment of the present disclosure.

FIG. 2 is a simplified block diagram representation of a server system 200, in accordance with an embodiment of the present disclosure. The server system 200 is an example of the server system 118 depicted in FIG. 1. In some embodiments, the server system 200 is embodied as a cloud-based and/or SaaS-based (software as a service) architecture. The server system 200 is configured to facilitate identifying anomalous users exhibiting overreaching access permissions to data objects.

The server system 200 includes a computer system 202 and a database 204. The database 204 is an example of the database 120 of FIG. 1. The computer system 202 includes at least one processor 206 (hereinafter referred to as "processor") for executing instructions, a memory 208, a communication interface 210, and a storage interface 214 that communicate with each other via a bus 212.

In some embodiments, the database 204 is integrated into the computer system 202. For example, the computer system 202 may include one or more hard disk drives as the database 204. In one embodiment, the database 204 is integrated within the computer system 202 and configured to store an instance of the access application 124. Further, the storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions for performing one or more operations for identifying anomalous users exhibiting overreaching access permissions to data objects within an enterprise. Examples of the processor 206 include but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include but are not limited to, a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

The processor 206 is operatively coupled to the communication interface 210 such that the processor 206 is capable of communicating with a remote device 216 such as the user devices 102-108, or with any entity connected to the network 122 (as shown in FIG. 1). In an embodiment, the processor 206 is configured to facilitate the access application 124 on the user devices 102-108 for enabling a plurality of functionalities to the devices described in the disclosure.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

Further, in an embodiment, the server system 200 includes an input/output (I/O) module 218, ananomaly identification module 220, a display management module 222, and a communication module 224. It should be noted that components, described herein, can be configured in a variety of ways, including electronic circuitries, digital arithmetic and logic blocks, and memory systems in combination with software, firmware, and embedded technologies. For example, the modules 218, 220, 222, and 224 can be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The I/O module 218 is configured to receive the user data and the access data associated with an enterprise. For instance, I/O module 218 receives the user data and access data, associated with users, groups, and data objects. The user data may include data associated with a plurality of users and a plurality of groups, where each user is associated with at least one group. The access data may include a plurality of data objects and corresponding access information. The data object can include an executable file or non-executable file, including a plurality of contents such as but not limited to, text, images, audio, video, animations, and the like.

Upon receipt of the user data and/or the access data, the anomaly identification module 220 may be configured to determine access permission data for each of the plurality of users. The access permission for each user indicates a set of data objects, among a plurality of data objects, accessible to the corresponding user. Each of the plurality of data objects corresponds to one of the plurality of categories. The access permission indicates a relation between each of the plurality of data objects with corresponding associated users of the plurality of users.

In an embodiment, when the access data is insufficient to determine access permissions-such as when the access data indicates relationships between groups and data objects, user data may be utilized. The user data may be used to determine group mapping information, which indicates a direct relationship between each group and the corresponding associated users from the plurality of users. The user data may be utilized for the determination of the group mapping information. The group mapping information transforms the complex group-to-group and group-to-user relationships into direct user-group relations by rolling the group membership so as to reduce the complexity of access control operations. This transformation enhances data retrieval efficiency by removing redundant group hierarchies.

In an embodiment, the anomaly identification module 220 may generate a hypergraph based on the user data and the access data. The hypergraph is a data structure that includes a set of vertices (or nodes) and a set of edges connecting the nodes. In this case, the plurality of users, plurality of groups, and plurality of data objects can be represented as nodes of the hypergraph. Further, the relation between these nodes can be represented through edges based on the user data and access data. For example, a group node may be connected to all the users within the group and users who belong to the groups within the group. The edges between the users and group can be referred to as membership edges, which can indicate a group mapping information between each of the plurality of groups with corresponding associated users of the plurality of users. The membership edge can be set based on the user data.

Similarly, the data object node may be connected to all the users that can access the data object, via edges. The edge between the user and the data object can be referred to as permission edges, which can indicate access permission data for each of the plurality of users.

Thus, the anomaly identification module 220 may use the hypergraph to identify the relationship between the users and groups, and the relationship between the users and the data objects. Thus, the hypergraph indicates a direct relationship among users, groups, and data objects. Based on the user data, the anomaly identification module 220 may use these relationships to compute group mapping information i.e. direct relationship or association between the users and groups, which indicates which user belongs to which group. For example, the user data indicates that user A belongs to group G1, and group G1 is a subset of group G2. In this case, the group mapping information establishes a direct relationship between user A and group G2.

In addition to the computation of the group mapping information, the anomaly identification module 220 may compute the access permission data for each of the plurality of users based on the access data and group mapping information. The access permission data indicates which user has access to which object. For example, user A belongs to group G1, and group G1 is a subset of group G2. In this case, the access permission data establishes a direct relationship between user A and data objects of groups G1 and G2.

In an embodiment, in order to determine the group mapping information and the access permission data, a subgraph may be selected from the hypergraph. A subgraph refers to a smaller, more specific subset of the larger hypergraph, containing some of the original vertices and edges. In order to determine the group mapping information or the user-group mapping, a subgraph may be selected within the hypergraph, which, for example, represents a subset of users belonging to a specific group, as well as the relationships (edges) between them. Thus, for each of the plurality of groups, one subgraph may be retrieved from the hypergraph, and membership edges in the corresponding subgraph indicate the users associated with the group, thereby determining the group mapping information.

In the same manner, to determine the access permission data representing user-data object mapping, a subgraph may be selected within the hypergraph, which, for example, represents a subset of data objects accessible to a specific user, as well as the relationships (edges) between them. Thus, for each of the plurality of users, one subgraph may be retrieved from the hypergraph, and permission edges in the corresponding subgraph indicate the data objects associated with the user, thereby determining the access permission data for the user.

In an embodiment, based on the access permission data associated with each of the plurality of users, the anomaly identification module 220 may be configured to determine first score data for each user of the plurality of users. The first score data is indicative of a degree of closeness between the access permission data of the corresponding user and an expected access permission data of the corresponding user.

In order to determine the first score data, the anomaly identification module 220 may determine second score data for the corresponding user for each of the plurality of categories based on the access permission data. The second score data may indicate dependency between a corresponding user and a corresponding category. In other words, second score data for a corresponding user and a corresponding category indicates a closeness between the current access permissions that the user has and an expected access permission or the ideal access permission for the respective category.

For example, if the plurality of users are u1, u2, ... uk, a plurality of categories are c1, c2, ..., cN, and a plurality of data objects are d1, d2, ... dM, then the second score data may be determined for each user-category pair. Thus, the second user data associated with user 'u1' are S1 ($u1$, c1), S2 ($u1$, c2), .... Sk (u1, cN). Here Si(ui, cj) indicates the second score data for user 'ui' and category 'cj'. In an embodiment, to determine the second score data, the anomaly identification module 220 may be configured to determine the following parameters for each user-category pair:

A first number of data objects ($A_1$) in the corresponding category that are accessible to the corresponding user, A second number of data objects ($A_2$) in the corresponding category that are inaccessible to the corresponding user, A third number of data objects ($A_3$) that are accessible to the corresponding user and belong to at least one of other categories, among the plurality of categories, excluding the corresponding category, A fourth number of data objects ($A_4$) that are inaccessible to the user and belong to at least one of the other categories, among the plurality of categories, excluding the corresponding category, and A total number (N) of the plurality of categories.

In an embodiment, the anomaly identification module 220 may determine all the above parameters based on the access permission data. In particular, the anomaly identification module 220 may identify the specific user for whom access permission is to be accessed. The anomaly identification module 220 may determine all the data objects that are mapped with the user and belong to the concerned category, thus determining the first number of data objects ($A_1$).

In an embodiment, the anomaly identification module 220 may determine all the data objects associated with the concerned category and remove the first number of data objects ($A_1$) from all the data objects associated with the concerned category to determine the second number of data objects ($A_2$). In another embodiment, the anomaly identification module 220 may determine objects that are associated with corresponding category and are accessible to all the users except the corresponding user, which corresponds to the secondnumber of data objects ($A_2$). For example, for the corresponding user 'u1' and the corresponding category 'c1', the anomaly identification module 220 may determinethe secondnumber of data objects ($A_2$) as objects that are associated with category 'c1' and are accessible to all the users except the corresponding user 'u1' i.e. 'u2, u3 ... , uk'.

In an embodiment, the anomaly identification module 220 may determine all the data objects that are accessible to the corresponding user and remove the first number of data objects from all the data objects accessible to the corresponding user to determine the third number of data objects ($A_3$). In another embodiment, the anomaly identification module 220 may determine objects that are associated with the corresponding user and are mapped to all the categories except the corresponding category. For example, for the corresponding user 'u1' and the corresponding category 'c1', the anomaly identification module 220 may determine objects that are associated with user 'u1' and are mapped to all the categories except the corresponding category 'c1' i.e. 'c2, c3 ... , cN'.

In an embodiment, the anomaly identification module 220 may determine a fourth number of data objects ($A_4$) by removing the first number of data objects ($A_1$), the second number of data objects ($A_2$), and the third number of data objects ($A_3$) from the total number of plurality of data objects i.e.

fourth number of data objects ($A_4$)=The total number of data objects (plurality of data objects)–$A_1$–$A_2$–$A_3$.

In an embodiment, the anomaly identification module 220 may count the number of categories that belong to at least one data object accessible to at least one user, which can be determined as the total number of categories (N).

Once all the above parameters are determined, the anomaly identification module 220 may calculate the second score data for each of the plurality of categories based on the above parameters. The second score data ($S_{c,u}$) for a corresponding category 'c' and a corresponding user 'u' is calculated as:

$$S_{c,u} = \frac{[N(A_1 A_4 - A_2 A_3)^2]}{[(A_1 + A_2)(A_1 + A_3)(A_2 + A_4)(A_3 + A_4)]} \quad (1)$$

The parameters such as the first number of data objects ($A_1$), thesecond number of data objects ($A_2$), the third number of data objects ($A_3$), and fourth number of data objects ($A_4$) are specific to a particular category and a particular user. Therefore, these parameters are computed separately in each case, to compute the second score data. The total number (N) of the plurality of categories is constant for each case of the second score data. In an embodiment, in the above example, if the number of categories is N and the number of users is k, then the total number of computations for the second score data would be N×k. Among these computations, N computations are associated with each user i.e. for each category, second score data is computed for the corresponding user.

The second score data represents a measure of how closely a user's actual (current) access permissions align with their expected or ideal access permissions for a particular category of data or files. The higher the second score data, the greater the closeness between the current permissions and their expected or ideal access permissions. It is reasonable to then infer that permissions of documents in a subcategory "c" for a given user "u" is anomalous if the score is close to zero.

The second score data provides an individualized closeness measure for each user-category pair. This score indicates the degree of similarity between the current permissions that the user actually has, and the expected or ideal permissions they are supposed to have for that category. A high second score suggests that the user's current permissions closely match the expected permissions, meaning their access level aligns well with what is intended. A low second score would indicate that the user's current permissions differ significantly from the expected permissions, which might signal an anomaly or a permissions misalignment. In short, the second score data functions as an alignment indicator, showing how accurately a user's current permissions for a given category match what's expected for them.

In an embodiment, the zero value of the second score data indicates category "c" and user "u" being independent i.e. the user "u" should not access any data objects or files belonging to category "c". Thus, permissions of documents in a category "c" for a given user "u" is anomalous if the score is close to zero. In other words, if a user has permission to access documents in a category where their second score data is close to zero, it signals a potential anomaly. This means the user's current permissions might not align with the expected permissions, potentially indicating unauthorized or unnecessary access.

In an embodiment, the anomaly identification module 220 may compute a first score data corresponding to a user based on all the second score data associated with the corresponding user. The first score data is the cumulative score data of the second score data, where the first score data represents a degree of closeness between the access permission data of the corresponding user and an expected access permission data of the corresponding user. In other words, more the first score data, the access permission data would be closer to the expected access permission or ideal access permission data of the corresponding user.

In an embodiment, the anomaly identification module 220 may determine the first score data for the corresponding user by computing the first score data as an average of the second score data associated with each of the plurality of categories for the user. For example, if the plurality of users are u1, u2, ... uk, a plurality of categories are (c1, c2, ... , cN), a total number of categories are N, and a plurality of data objects are d1, d2, ... dM, then the second score data may be determined for each user-category pair, thus, the second user data associated with user 'u1' are S1 ($u1$, c1), S2 ($u1$, c2), ... , SN (u1, cN). Accordingly, the first score data for user 'u1' can be calculated as $$\text{First score data } F(u1) = \frac{1}{N} \sum_{i=1}^{i=N} Si(u1, ci) \quad (2)$$

Or $$\text{First score data } F(u1) = \frac{1}{N}(S1(u1, c1) + S2(u1, c2) + \ldots + Sk(u1, cN)) \quad (3)$$

Similarly, the first score data can be computed for other users such as u2, u3, ... , uN. For example:

$$\text{For user } 'u2', \text{ First score data } F(u2) = \frac{1}{N} \sum_{i=1}^{i=N} Si(u2, ci)$$

-continued

For user 'u3', First score data $F(u3) = \frac{1}{N}\sum_{i=1}^{i=N} Si(u3, ci)$

⋮

For user 'uk', First score data $F(uk) = \frac{1}{N}\sum_{i=1}^{i=N} Si(uk, ci)$ The first score data provides an overall measure for each user, based on how closely their current access permissions align with the expected or ideal permissions across all categories. The first score data is calculated for each user by combining individual closeness measures (second score data) across various categories. This gives an overall indication of how well a user's permissions align with the ideal. However, to identify anomalies, the computation of the first score data may not be enough. To accurately flag anomalies, a specific threshold is needed. This threshold acts as a baseline to separate normal user permissions from permissions that may indicate unusual or unauthorized access patterns. If a user's first score is above the threshold, it suggests their permissions are well-aligned with the ideal or expected permissions, indicating normal access. If a user's first score falls below the threshold, it may signal a misalignment, potentially flagging an anomaly. Thus, the threshold enables the system to differentiate between acceptable access levels and those that might indicate an anomaly in permissions.

The threshold is uniform across all users i.e., the same threshold value is used to assess access levels or behaviors, without adjusting for individual user characteristics. This approach simplifies implementation by setting a single standard, making it easier to flag anomalies when first score data exceeds this fixed threshold.

In an embodiment, the threshold value of the first score data may be based on statistical characteristics associated with the first score data. To compute the threshold value of the first score data, the anomaly identification module 220 may generate an ascending order of the first score data for the plurality of users. As the first score data has the numerical value, this ordering allows the anomaly identification module 220 to rank users based on how closely their current access permissions align with the ideal permissions. Once all the score data are aligned in ascending order, the anomaly identification module 220 may cluster the plurality of users into a first set of groups based on the ascending order of the first score data for the plurality of users. This clustering organizes users with similar first scores into the same group, allowing for a comparison across different levels of access permission alignment.

Figure 4:
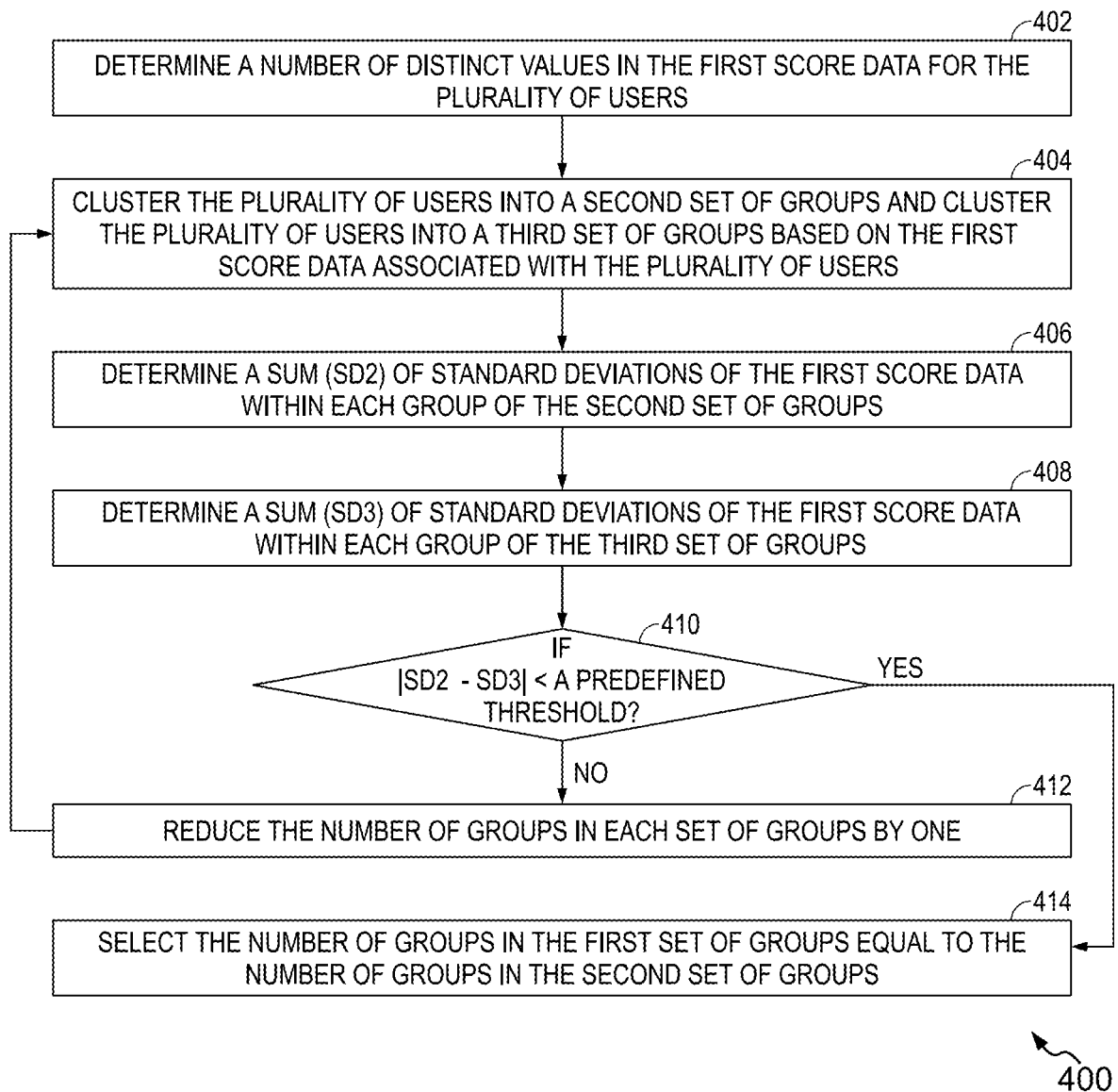
FIG. 4 is a flow diagram of a method 400 for determining a number of groups in the first set of groups as referenced in FIG. 3, in accordance with an embodiment of the present disclosure.

The number of groups in the first set of groups is determined using the following method, as also referenced in FIG. 4. To determine the number of groups in the first set of groups, the anomaly identification module 220 may determine a number of distinct values in the first score data for the plurality of users. The anomaly identification module 220 may then cluster the plurality of users into a second set of groups and a third set of groups based on the first score data associated with the plurality of users. In other words, theanomaly identification module 220 may cluster the plurality of users into both sets of groups individually such that each of the plurality of users is present in both sets of groups. The number of groups (k) in the second set of groups is equal to the number of distinct values in the first score data, whereas the number of groups in the third set of groups is one group lesser (k−1) than the second set of groups. Thus, the system 118 may group the plurality of users into the second set of groups based on the number of groups (k) and may group the plurality of users into the third set of groups based on the number of groups (k−1).

The anomaly identification module 220 may then determine a sum of standard deviations of the first score data within each group of the second set of groups. In particular, the standard deviation of each group within the second set of groups is determined. Once the standard deviations of all the groups within the second set of groups are determined, the anomaly identification module 220 may determine a sum of standard deviations of all the groups within the second set of groups.

Similarly, the anomaly identification module 220 may determine a sum of standard deviations of the first score data within each group of the third set of groups. In particular, the standard deviation of each group within the third set of groups is determined. Once the standard deviations of all the groups within the third set of groups are determined, the anomaly identification module 220 may determine a sum of standard deviations of all the groups within the third set of groups.

The anomaly identification module 220 maythen determine whether the difference between the sum of standard deviations for the second set of groups and the sum of standard deviations for the third set of groups is less than a first predefined threshold.

In case, the difference between the sum of standard deviations for the second set of groups and the sum of standard deviations for the third set of groups is not less than a first predefined threshold, the anomaly identification module 220 may iteratively reduce the number of groups in each set of groups by one and then repeat the step of clustering and determining a sum of standard deviation for the second and third sets of groups in each iteration until the difference between the sum of standard deviations for second set of groups and the sum of standard deviations for third set of groups is less than a first predefined threshold.

When the difference between the sum of standard deviations for the second set of groups and the sum of standard deviations for the third set of groups is less than the first predefined threshold, the system 118 may select the number of groups in the first set of groups to be equal to the number of groups in the second set of groups. In other words, the number of groups in the second set of groups can be taken as number of groups in the first set of groups. Thus, the number of groups in the first set of groups can be determined to cluster the plurality of users into the first set of groups.

Upon clustering the plurality of users into the first set of groups, the anomaly identification module 220 may select a group from the first set of groups that has the lowest value of the first score data. As the clustering of the plurality of users is performed based on the ascending order of the first score data, the first group among the first set of groups would have the lowest value of first score data among all the groups of the first set of groups.

The anomaly identification module 220 may determine a maximum value of first score data within the selected group, as the threshold value. The threshold for identifying potential anomalies is set to the maximum value of first score data within the selected group of users. This threshold serves as a cutoff, distinguishing between normal and potentially anomalous access permissions. Users with a first score data above this threshold are considered to have access permissions that align closely with the expected or ideal permissions, indicating normal access. In contrast, users with a score at or below this threshold are flagged as potentially anomalous, as their permissions may deviate from the expected, warranting further review.

The anomaly identification module 220 may identify a subset of users, among the plurality of users, such that the first score data for each of the subset of users is equal to or below the computed threshold value. The subset of users constitutes the anomalous users exhibiting overreaching access permission. This group can represent users whose access permissions are most divergent from the expected or ideal permissions, potentially signaling an anomaly in their access levels. The users associated with the selected group having the lowest value of first score data can constitute the subset of users or anomalous users.

Upon identification of the anomalous users, the anomaly identification module 220 can automatically trigger an alert signal to be transmitted to another computing device controlled by an administrator, providing details about the anomalous behavior for further investigation. The alert signal may include information about the user's access pattern, flagged permissions, and any data objects accessed.

In another embodiment, the anomaly identification module 220 can automatically trigger a review process for the identified anomalous users, which can involve a systematic assessment of the user's access level to ensure permissions align with their role and responsibilities.

In another embodiment, upon identification of the anomalous users, the anomaly identification module 220 can temporarily revoke or restrict the access for the anomalous users to sensitive data objects until a thorough review of the access permission data of the anomalous users is completed. Restricting access can include downgrading access to read-only or limiting access to specific categories of data.

In another embodiment, the system can conduct a thorough review or continuous monitoring of all activities associated with the anomalous users, focusing on actions such as data access, document retrieval, and file interactions. For each user, the system can log details about which specific documents or data objects were accessed, along with timestamps, access frequency, and any actions taken (e.g., view, edit, download). This enables the system to build a comprehensive profile of typical access patterns for the anomalous users, which can help in distinguishing legitimate activity from potential security threats and identifying anomalous access events in real time.

Identifying anomalous users with overreaching access permissions offers several advantages, particularly for security, compliance, and efficient access management. The identification of overreaching permissions addresses practical security risks, directly integrating an access control improvement into the system to prevent unauthorized access. This integration of improved security measures reduces the likelihood of breaches, achieving an operational improvement in system security. For example, based on the detected anomaly users, the system can restrict the grouping of the users within the organization. In particular, the system can restructure the grouping of the users within the enterprises. The restructuring the grouping of the users can also remove unnecessary groups to better align with actual usage patterns. This limits the organization's exposure to potential security breaches and insider threats. Moreover, by optimizing the group structure, organizations can maintain tighter control over sensitive data, ensuring that only the authorizedusers or teams have access to particular information, files, or systems.

Furthermore, by adjusting permissions based on user behavior analysis, this method optimizes access management workflows. The resulting efficiency in handling user permissions improves the operational functioning of access management systems by directly reducing administrative burden and minimizing errors, resulting in a concrete, beneficial outcome.

The identification of overreaching permissions detects anomalies associated with access management, thereby decreasing the risk of insider threats by aligning permissions more closely with job roles and preventing access misuse or exploitation. This provides a security-based improvement to the access system, contributing to the overall integrity and safety of sensitive data.

In an embodiment, the display management module 222 is configured to display the set of data objects such as documents according to the access request. Further, the display management module 222 is also configured to display a message indicating user information associated with the anomalous users and corresponding data object information.

Although FIG. 2 shows the hardware elements of the server system 200, it is to be understood that other embodiments are not limited thereon. In other embodiments, the server system 200 may include fewer or more number of elements. Further, the labels or names of the elements are used only for illustrative purposes and do not limit the scope of the invention. One or more components can be combined to perform the same or substantially similar function.

Figure 3:
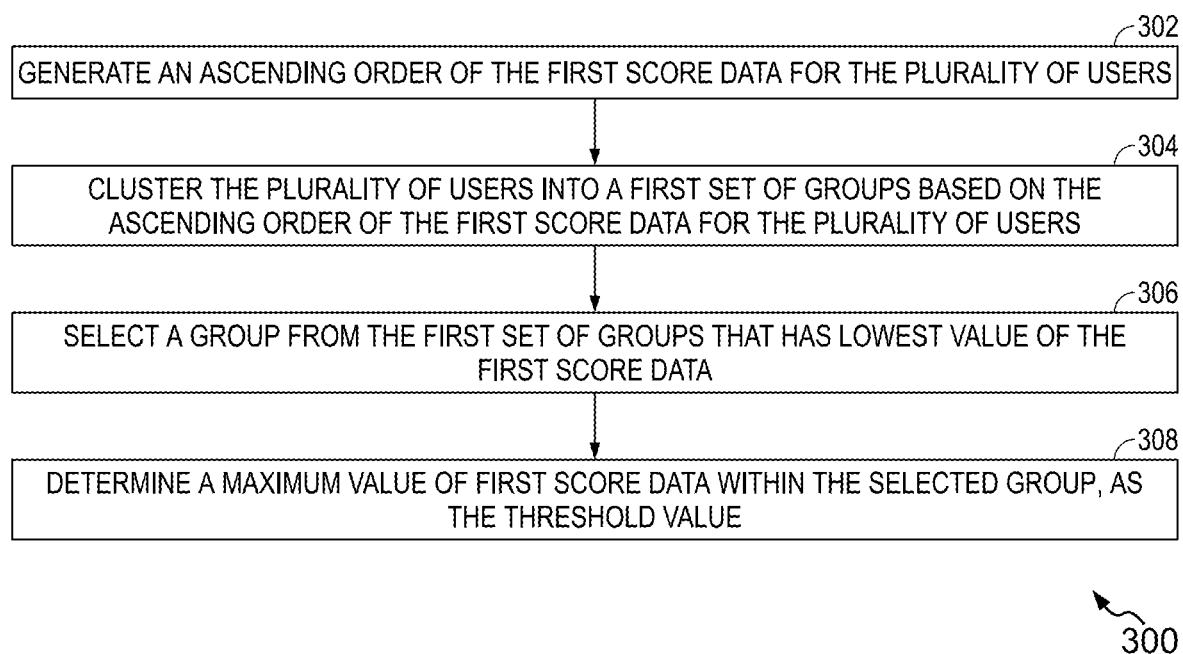
FIG. 3 illustrates a flow chart illustrating a method for computing a threshold value of the first score data for identification of the anomalous users, in accordance with an embodiment of the present disclosure.

FIG. 3 illustrates a flow chart illustrating a method 300 for computing a threshold value of the first score data for identification of the anomalous users, in accordance with an embodiment of the present disclosure. The method 300 depicted in the flow diagram may be executed by, for example, the at least one server system such as the server system 118. Operations of the method 300, and combinations of the operations in the method 300, may be implemented by, for example, hardware, firmware, a processor, circuitry, and/or a different device associated with the execution of software that includes one or more computer program instructions. The sequence of operations of the method 300 may not be necessarily executed in the same order as they are presented. Further, one or more operations may be grouped and performed in the form of a single step, or one operation may have several sub-steps that may be performed in parallel or a sequential manner.

The method 300 describes a method for computing a threshold value of the first score data defining a boundary value of the first score data for identification of the anomalous users. The method 300 starts with step 302.

At step 302, the server system 118 may generate an ascending order of the first score data for the plurality of users upon computation of the first score data for the plurality of users. To generate the ascending order of the first score data, the server system 118 may perform a sorting operation on a dataset of the first score data. The sorting operation may arrange the first score data in ascending order, placing users with the lowest scores at the beginning and the highest scores at the end. Sorting algorithms such as quicksort, merge sort, or even a built-in sorting function can generate the ascending order of the first score data efficiently.

At step 304, the server system 118 may cluster the plurality of users into a first set of groups based on the ascending order of the first score data for the plurality of users. In particular, with the ordered list of first score data, the server system 118 may then group users into a first set of groups. The number of groups in the first set of groups and grouping of the users i.e. the number of users in each of the first set of groups is determined using as method referenced in FIG. 4. Each group in this set represents users with similar first score data values, meaning that users within the same group have scores that are closer to each other compared to users in different groups. This clustering process creates logical divisions among users, separating those whose scores may reflect different levels of alignment with expected permissions.

At step 306, among the groups created in the first set of groups based on ascending order of first score data, the server system 118 may select the group containing the lowest first score data values. This first groupcan include users who, compared to others, have the smallest scores, greatest deviation from ideal access permissions, potentially indicating overreaching or risky permissions. Since the groups are arranged in ascending order, the first group naturally has the lowest range of first score data across all groups.

At step 308, within the selected group of users (the group that has the lowest scores overall), the server system 118 may determine a maximum value of the first score data within the selected group, as the threshold value. In particular, the server system 118 may calculate the highest first score data value among the users in that group. This maximum value represents the upper boundary of first score data within the lowest-scoring group or selected group. This maximum score is determined as the threshold value, which is a cut-off point for identifying users with potentially excessive permissions. The user with a first score data at or below this threshold may be flagged as exhibiting overreaching permissions.

FIG. 4 is a flow diagram of a method 400 for determining a number of groups in the first set of groups as referenced in FIG. 3, in accordance with an embodiment of the present disclosure. The method 400 depicted in the flow diagram may be executed by, for example, the at least one server system such as the server system 118. Operations of the flow diagram of the method 400, and combinations of operations in the flow diagram of the method 400, may be implemented by, for example, hardware, firmware, a processor, circuitry, and/or a different device associated with the execution of software that includes one or more computer program instructions. The method 400 starts at operation 402. In an embodiment, the method 400 can be performed based on Jenks natural breaks optimization method.

At step 402, the system 118 may determine a number of distinct values in the first score data for the plurality of users. For example, if the first score data for 6 users are 0.01, 0.1, 0.1, 0.5, 0.5, and 0.8, there are only four unique/distinct values. If the first score data were 0.1, 0.1, 0.1, 0.1, 0.2, and 0.2, there are only two unique/distinct values.

At step 404, the system 118 may cluster the plurality of users into a second set of groups and cluster the plurality of users into a third set of groups based on the first score data associated with the plurality of users. In other words, the system 118 may cluster the plurality of users into both sets of groups individually such that each of the plurality of users is present in both set of groups. The number of groups (k) in the second set of groups is equal to the number of distinct values in the first score data, whereas the number of groups in the third set of groups is one group lesser (k–1) than the second set of groups. Thus, the system 118 may group the plurality of users into the second set of groups based on the number of groups (k) and may group the plurality of users into the third set of groups based on the number of groups (k–1).

In an embodiment, in order to cluster the plurality of users into the second set of groups, the system 118 may determine an ascending order of the first score data. Once, the ascending order of the first score data is determined, the system 118 may cluster the plurality of users into a second set of groups randomly while maintaining the ascending order of the first score data, where the number of groups (k) in the second set of groups is initialized with the number of distinct values in the first score data. Thus, each group may have the different number of users.

Determination of the third set of groups from the second set of groups may be performed using various methods. In an example, from the groupings of the second set of groups, the group with the highest standard deviation is selected to be removed among the second set of groups, and all usersof that group is reallocated to the neighboring groups (while maintaining the ascending order), to form a third set of groups. For each user in the selected group, the corresponding first score data of the user is compared to the mean value of the neighboring group i.e. "lower" or "upper" group in ascending arrangement of first score data and the corresponding user is assigned to the group whose mean value is the closest to the corresponding first score data.

In other words, the system 118 may initially form the second set of groups randomly with the number of groups (k) as the number of distinct values in the first score data, while still maintaining the condition that the number of groups (k) matches the number of distinct values in the first score data. However, the method for reallocating users to achieve one fewer group (i.e., transitioning from k groups to k–1 groups) does not need to follow a fixed approach.

For example, the system 118 may identify the group with the highest standard deviation from the current grouping (with k groups) and reallocate the usersof that group to the neighboring groups to achieve (k–1) groups. This reallocation is performed by comparing each user's first score data to the mean value of its potential neighboring groups (e.g., a "lower" group and an "upper" group, when arranged in the ascending order). Each user is then assigned to the group whose mean value is closest to its own value. Thus, the third set of groups (with k–1 groups) are formed based on the second set of groups (with k groups).

For example, if first score data for 9 users are 2, 4, 5,3,2, 6,4, 8, 8 then,

In the first iteration:

The number of distinct values=6 i.e. the number of groups is 6.

Ascending order—2, 2, 3, 4, 4, 5, 6, 8, 8

Second set of groups: (2), (2,3), (4, 4), (5), (6,8), (8)—(arrangement of groups corresponds to ascending order of first score data)—arbitrary group formation In the second set of groups, group (6, 8) has the highest deviation. Thus, neighboring groups are lower group (5) and upper group (8), and accordingly, all the users of group (6, 8) are reallocated to either ofneighboring groups (5) and (8). The value 6 is closer to mean value of group (5), while value 8 is closer to mean value of group (8).

Thus, the third set of groups is formed as follows: (2), (2,3), (4, 4), (5, 6), (8, 8).

At step 406, the system 118 may determine a sum (SD$_2$) of the standard deviations (SD$_2$) of the first score data within each group of the second set of groups. In particular, the standard deviation of each group within the second set of groups is determined. Once the standard deviations of all the groups within the second set of groups are determined, the system 118 may determine a sum of standard deviations of all the groups within the second set of groups.

At step 408, the system 118 may determine a sum ($SD_3$) of standard deviations of the first score data within each group of the third set of groups. In particular, the standard deviation of each group within the third set of groups is determined. Once the standard deviations of all the groups within the third set of groups are determined, the system 118 may determine a sum of standard deviations of all the groups within the third set of groups.

At step 410, the system 118 may determine whether the difference between the sum of standard deviations for the second set of groups and the sum of standard deviations for the third set of groups is less than a first predefined threshold i.e. if $|SD_2-SD_3|$<a predefined threshold.

In case, the difference between the sum of standard deviations for the second set of groups and the sum of standard deviations for the third set of groups is not less than a first predefined threshold, the system 118 may reduce the number of groups in each set of groups by one at step 412 i.e. if the number of groups in the second set of groups was k and number of groups in the third set of groups are k−1, then the system 118 may reduce the number of groups to k−1 and k−2, respectively. Thus, in the current iteration, second set of groups may be determined as the third set of groups of the previous iteration and accordingly, as mentioned above, the third set of groups for the current iteration can be derived from the second set groups for the current iteration.

Upon reducing the number of groups, the steps 404-408 are repeated until the specific condition is met. Thus, iteratively reducing the number of groups in each set of groups by one and repeating the steps 404-408 in each iteration are performed until the specific condition—the difference between the sum of standard deviations for the second set of groups and the sum of standard deviations for the third set of groups is less than the first predefined threshold—is met.

At step 414, when the difference between the sum of standard deviations for the second set of groups and the sum of standard deviations for the third set of groups is less than the first predefined threshold, the system 118 may select the number of groups in the first set of groups to be equal to the number of groups in the second set of groups. When the difference between the sum of standard deviations for the second set of groups (k groups) and the third set of groups (k−1 groups) falls below a predefined threshold, it indicates that further reducing the number of groups does not significantly improve clustering efficiency or consistency. At this point, the system identifies the second set of groups from the most recent iteration as the optimal configuration for grouping users. This decision is based on the observation that the difference in clustering performance between the two configurations is minimal and within acceptable limits.

Consequently, the iteration process stops, and the second set of groups is determined as the first set of groups as referred in FIG. 3, representing the best clustering structure achieved during the process. In this case, the second set of groups is the same as first set of groups as referred in FIG. 3 i.e. when the above difference is less than the threshold, the iteration process stops and the second set of groups corresponds to the last iteration can be considered as the first set of groups.

In method 400, the number of groups in the first set of groups is determined by minimizing the standard deviations within each group in the second set while maximizing an average of standard deviation of all the groups in the second set. When this condition is satisfied, the number of groups in the second set of groups is selected for the first set as referenced in the FIG. 3.

Figure 5:
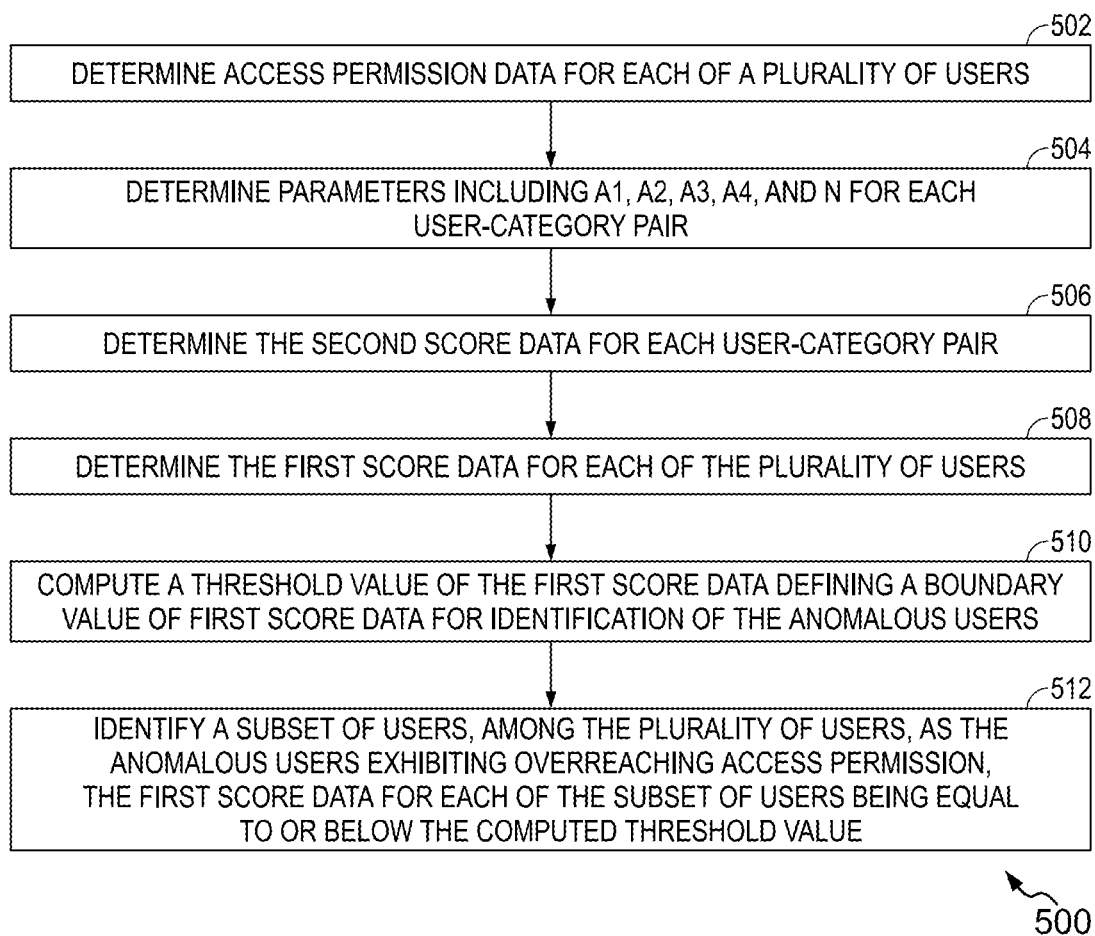
FIG. 5 is a flow diagram of a computer-implemented method for identifying anomalous users exhibiting overreaching access permissions to data objects, in accordance with an embodiment of the present disclosure.

FIG. 5 is a flow diagram of a computer-implemented method 500 for identifying anomalous users exhibiting overreaching access permissions to data objects, in accordance with an embodiment of the present disclosure. The method 500 depicted in the flow diagram may be executed by, for example, the at least one server system such as the server system 118. Operations of the flow diagram of the method 500, and combinations of operations in the flow diagram of the method 500, may be implemented by, for example, hardware, firmware, a processor, circuitry, and/or a different device associated with the execution of software that includes one or more computer program instructions. The method 500 starts at operation 502.

At 502, the method 500 includes determining access permission data for each of a plurality of users. The access permission data for each user indicates a set of data objects, among a plurality of data objects, accessible to the corresponding user. Each of the plurality of data objects corresponds to one of a plurality of categories.

At 504, the method 500 includes determining parameters including a first number of data objects ($A_1$), a second number of data objects ($A_2$), a third number of data objects ($A_3$), a fourth number of data objects ($A_4$), and total number (N) of the plurality of categories for each user-category pair. Thus, for each user and each category, these parameters are determined.

At step 506, the method includes determining the second score data for each user and each category associated with each user based on the determined parameters. For example, if the plurality of users u1, u2 . . . , uk and the plurality of categories c1, c2 . . . , cN are associated with the plurality of data objects. Then the system 118 may determine the second score data for the plurality of users as follows For user 'u1'—{S1 ($u1$, c1), S2 ($u1$, c2) . . . , Sk (u1, cN)},
For user 'u2'—{S1 ($u2$, c1), S2 ($u2$, c2) . . . , Sk (u2, cN)},
For user 'uN'—{S1 ($u1$, c1), S2 ($u1$, c2) . . . , Sk (u1, cN)}.

At step 508, the method includes determining the first score data for each user based at least on the determined second score data for each of the plurality of categories. Based on each set of second score data associated with each user, a corresponding first score data can be determined as follows:

For user 'u1'—{S1 ($u1$, c1), S2 ($u1$, c2), . . . , Sk (u1, cN)}☐F1 ($u1$)
For user 'u2'—{S1 ($u2$, c1), S2 ($u2$, c2), . . . , Sk (u2, cN)}, ☐F2 ($u2$).
For user 'uN'—{S1 ($u1$, c1), S2 ($u1$, c2), . . . , Sk (u1, cN)}☐Fk (uk)

At step 510, the method includes computing a threshold value of the first score data defining a boundary value of the first score data for identification of the anomalous users. The threshold value of the first score data is computed based on statistical characteristics associated with the first score data. In particular, computing the threshold value may include generating an ascending order of the first score data for the plurality of users and clustering the plurality of users into a first set of groups based on the ascending order of the first score data for the plurality of users. Computing the threshold value further includes selecting a group from the first set of groups that has the lowest value of the first score data and determining a maximum value of first score data within the selected group, as the threshold value.

At step 512, the method includes identifying a subset of users, among the plurality of users, as the anomalous users exhibiting overreaching access permission. The first score data for each of the subset of usersis equal to or below the computed threshold value.

Figure 6:
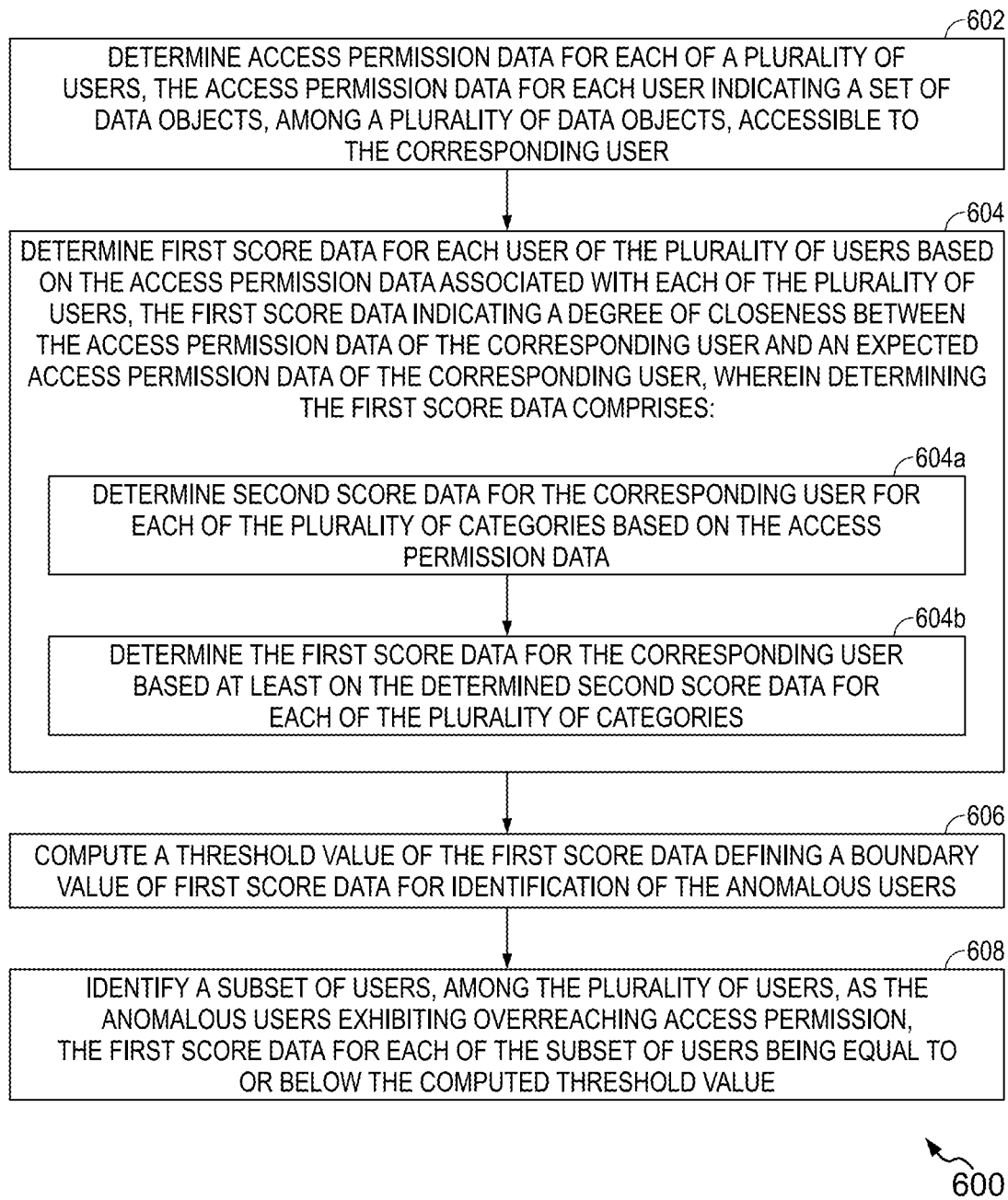
FIG. 6 is a flow diagram of a computer-implemented method for identifying anomalous users exhibiting overreaching access permissions to data objects, in accordance with another embodiment of the present disclosure.
Figure 7:
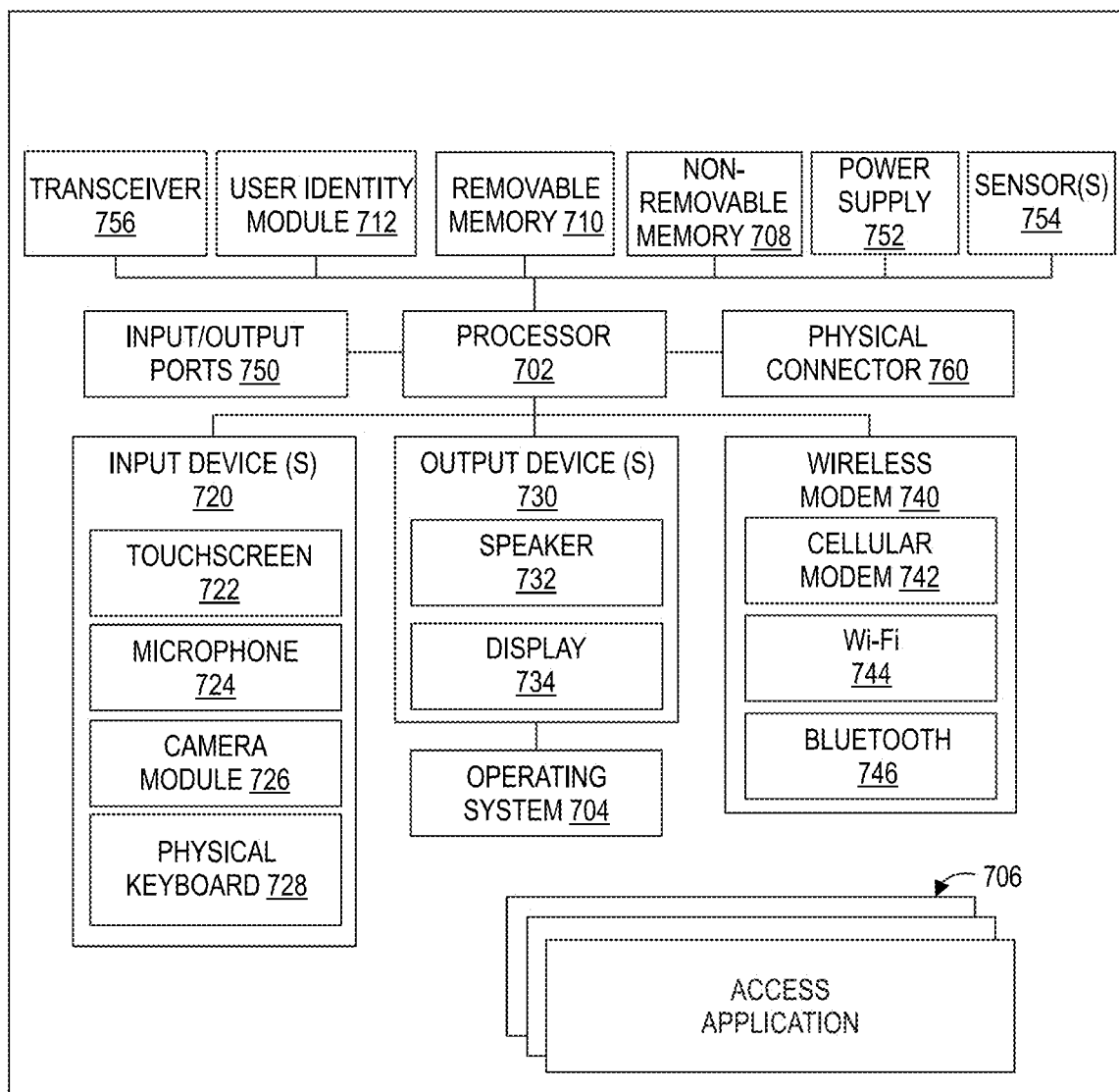
FIG. 7 is a simplified block diagram of auser device, in accordance with various embodiments of the present disclosure.

FIG. 6 is a flow diagram of a computer-implemented method 600 for identifying anomalous users exhibiting overreaching access permissions to data objects, in accordance with another embodiment of the present disclosure. The method 600 depicted in the flow diagram may be executed by, for example, the at least one server system such as the server system 118. Operations of the flow diagram of the method 600, and combinations of operations in the flow diagram of the method 600, may be implemented by, for example, hardware, firmware, a processor, circuitry, and/or a different device associated with the execution of software that includes one or more computer program instructions. The method 600 starts at operation 602.

At step 602, the method 600 includes determining access permission data for each of a plurality of users. The access permission data for each user indicates a set of data objects, among a plurality of data objects, accessible to the corresponding user. Each of the plurality of data objects corresponds to one of a plurality of categories. The access permission data may be determined based on access data. The access data may include data associated with the plurality of data objects and corresponding access information and the access information indicates a set of users or groups, from the plurality of users or a plurality of groups, respectively, authorized to access each respective data object of the plurality of data objects.

At step 604, the method 600 includes determining first score data for each user of the plurality of users based on the access permission data associated with each of the plurality of users, the first score data indicating a degree of closeness between the access permission data of the corresponding user and an expected access permission data of the corresponding user. The determining first score data for each user of the plurality of users comprises determining second score data for the corresponding user for each of the plurality of categories based on the access permission dataat step 604a. The determining first score data for each user of the plurality of users further comprises determining second score data for the corresponding user for each of the plurality of categories based on the access permission data at step 604b.

At step 606, the method 600 includes computing a threshold value of the first score data defining a boundary value of the first score datafor identification of the anomalous users.

The threshold value of the first score data is computed based on statistical characteristics associated with the first score data. In particular, computing the threshold value may include generating an ascending order of the first score data for the plurality of users and clustering the plurality of users into a first set of groups based on the ascending order of the first score data for the plurality of users. Computing the threshold value further includes selectinga group from the first set of groups that has lowest value of the first score data and determining a maximum value of first score data within the selected group, as the threshold value.

At step 608, the method 600 includes identifying a subset of users, among the plurality of users, as the anomalous users exhibiting overreaching access permission. The first score data for each of the subset of users is equal to or below the computed threshold value.

FIG. 7is a simplified block diagram of a user device 700 for example, a mobile phone or a desktop computer capable of implementing the various embodiments of the present disclosure. For example, the user device 700 may correspond to the user devices 102-108 of FIG. 1. The user device 700 is depicted to include one or more applications, such as anaccess application 706 facilitated by the server system 118. The access application 706 can be an instance of an application downloaded from the server system 118 or a third-party server. The access application 706 is capable of communicating with the server system 118 for identifying anomalous users shown in FIG. 1.

It should be understood that the user device 700 as illustrated and hereinafter described is merely illustrative of one type of device and should not be taken to limit the scope of the embodiments. As such, it should be appreciated that at least some of the components described below in connection with the user device 700 may be optional, and thus in an example embodiment may include more, less, or different components than those described in connection with the example embodiment of FIG. 7. As such, among other examples, the user device 700 could be any mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 700 includes a controller or a processor 702 (e.g., a signal processor, microprocessor, ASIC, or other control, and processing logic circuitry) for performing such tasks as signal coding, data processing, image processing, input/output processing, power control, and/or other functions. An operating system 704 controls the allocation and usage of the components of the user device 700 and supports one or more application programs, such as the access application 706, that implements one or more of the innovative features described herein. In addition to the access application 706, the applications may include common mobile computing applications (e.g., telephony applications, email applications, calendars, contact managers, web browsers, and messaging applications) or any other computing application.

The illustrated user device 700 includes one or more memory components, for example, a non-removable memory 708 and/or a removable memory 710. The non-removable memory 708 and the removable memory 710 may be collectively known as a database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the access application 706. The user device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in the form of the SIM card is well known in Global Systems for Mobile (GSM) communication systems, Code Division Multiple Access (CDMA) systems, or third-generation (3G) wireless communication protocols such as Universal Mobile Telecommunications System (UMTS), CDMA9000, wide-band CDMA (WCDMA) and time division-synchronous CDMA (TD-SCDMA), or with fourth-generation (4G) wireless communication protocols such as LTE (Long-Term Evolution).

The user device 700 can support one or more input devices 720 (hereinafter referred to as "input devices") and one or more output devices 730 (hereinafter referred to as "output devices"). Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device, or a local wireless data network or router, and/or a Bluetooth-compatible modem 746. The wireless modem 740 is typically configured for communication with one or more cellular networks, such as a GSM network for data and voice communications within a single cellular network, between cellular networks, or between the user device 700 and a public switched telephone network (PSTN).

The user device 700 can further include one or more input/output ports 750, a power supply 752, one or more sensors 754 (e.g., an accelerometer, a gyroscope, a compass, or an infrared proximity sensor) for detecting the orientation or motion of the user device 700 and biometric sensors for scanning biometric identity of an authorized user, a transceiver 756 (for wirelessly transmitting analog or digital signals) and/or a physical connector 760, which can be a USB port, IEEE 794 (Fire Wire) port, and/or RS-232 port. The illustrated components are not required or all-inclusive, as any of the components shown can be deleted and other components can be added.

The disclosed methods 300, 400, 500, and 600, or one or more operations of these methods may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing device). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Particularly, the server system 118 and its various components such as the computer system 202 and the database 204 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based on these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for identifying anomalous users exhibiting overreaching access permissions to data objects, the method comprising:
   determining, by a server system, access permission data for each of a plurality of users, the access permission data for each user indicating a set of data objects, among a plurality of data objects, accessible to the corresponding user, wherein each of the plurality of data objects corresponds to one of aplurality of categories;
   determining, by the server system, first score data for each user of the plurality of users based on the access permission data associated with each of the plurality of users, the first score data indicating a degree of closeness between the access permission data of the corresponding user and an expected access permission data of the corresponding user, wherein determining the first score data comprises:
      determining, by the server system, second score data for the corresponding user for each of the plurality of categories based on the access permission data, and
      determining, by the server system, the first score data for the corresponding user based at least on the determined second score data for each of the plurality of categories;
   computing, by the server system, a threshold value of the first score data defining a boundary value of the first score datafor identification of the anomalous users; and
   identifying, by the server system, a subset of users, among the plurality of users, as the anomalous users exhibiting overreaching access permission, wherein the first score data for each of the subset of users is equal to or below the computed threshold value.

2. The method as claimed in claim 1, wherein determining the first score data for the corresponding user based at least on the determined second score data associated with each of the plurality of categoriescomprises computing the first score data as an average of the second score data associated with each of the plurality of categories for the corresponding user.

3. The method as claimed in claim 1, wherein computing the threshold value of the first score data comprises computing the threshold value based on statistical characteristics associated with the first score data associated with the plurality of users.

4. The method as claimed in claim 1, wherein computing the threshold value of the first score data comprises:
   generating an ascending order of the first score data for the plurality of users;
   clustering the plurality of users into a first set of groups based on the ascending order of the first score data for the plurality of users;
   selecting a group from the first set of groups that has lowest value of the first score data; and
   determining a maximum value of first score data within the selected group, as the threshold value.

5. The method as claimed in claim 4, wherein the number of groups in the first set of groups is determined by:
   (a) determining, by the server system, a number of distinct values in the first score data for the plurality of users,
   (b) clustering, by the server system, the plurality of users into a second set of groups and the plurality of users into a third set of groups based on the first score data associated with the plurality of users, wherein the number of groups in the second set of groups is equal to the number of distinct values in the first score data, and wherein the number of groups in the third set of groups is one group lesser than the second set of groups,
   (c) determining, by the server system, a sum of standard deviations of the first score data within each group of the second set of groups,
   (d) determining, by the server system, a sum of standard deviations of the first score data within each group of the third set of groups,
   (e) iteratively reducing, by the server system, the number of groups in each set of groups by one and repeating the steps (b)-(d) in each iteration until a difference between the sum of standard deviations for the second set of groups and the sum of standard deviations for the third set of groups is less than a first predefined threshold, and
   (f) when the difference between the sum of standard deviations for the second set of groups and the sum of standard deviations for the third set of groups is less than the first predefined threshold, selecting, by the server system, the number of groups in the first set of groups to be equal to the number of groups in the second set of groups.

6. The method as claimed in claim 1, further comprising:
   obtaining, by the server system, access data comprising data associated with the plurality of data objects and corresponding access information,
   wherein the access information indicates a set of users or groups, from the plurality of users or a plurality of groups, respectively, authorized to access each respective data object of the plurality of data objects, and
   wherein the access permission data for each of the plurality of users is determined based at least on the access data.

7. The method as claimed in claim 6, further comprising:
   obtaining, by the server system, user data comprising data associated with the plurality of users and the plurality of groups, wherein each of the plurality of users is associated with at least one group of the plurality of groups,
   wherein the user data specifies a group membership of each of the plurality of users and one or more of the plurality of groups, and
   wherein the access permission data for each of the plurality of users is determined further based on the user data.

8. A server system, the system comprising:
   a memory configured to store instructions;
   a communication interface; and
   a processor in communication with the memory and the communication interface, the processor configured to execute the instructions stored in the memory and thereby cause the system to perform at least in part to:
   determine access permission data for each of a plurality of users, the access permission data for each user indicating a set of data objects, among a plurality of data objects, accessible to the corresponding user, wherein each of the plurality of data objects corresponds to one of aplurality of categories;
   determine first score data for each user of the plurality of users based on the access permission data associated with each of the plurality of users, the first score data indicating a degree of closeness between the access permission data of the corresponding user and an expected access permission data of the corresponding user, wherein to determine the first score data, the server system is caused to:
    determine second score data for the corresponding user for each of the plurality of categories based on the access permission data, and
    determine the first score data for the corresponding user based at least on the determined second score data for each of the plurality of categories;
    compute a threshold value of the first score data defining a boundary value of the first score data for identification of the anomalous users; and
    identify a subset of users, among the plurality of users, as the anomalous users exhibiting overreaching access permission, wherein the first score data for each of the subset of users is equal to or below the computed threshold value.

9. The system as claimed in claim 8, wherein to determine the first score data for the corresponding user based at least on the determined second score data associated with each of the plurality of categories, the system is caused to compute the first score data as an average of the second score data associated with each of the plurality of categories for the corresponding user.

10. The system as claimed in claim 8, wherein the threshold value of the first score data is computed based on statistical characteristics associated with the first score data associated with the plurality of users.

11. The system as claimed in claim 8, wherein to compute the threshold value of the first score data, the system is caused to:
    generate an ascending order of the first score data for the plurality of users;
    cluster the plurality of users into a first set of groups based on the ascending order of the first score data for the plurality of users;
    select a group from the first set of groups that has lowest value of the first score data; and
    determine a maximum value of first score data within the selected group, as the threshold value.

12. The system as claimed in claim 11, wherein to determine the number of groups in the first set of groups, the system is caused to:
    (a) determine a number of distinct values in the first score data for the plurality of users,
    (b) cluster the plurality of users into a second set of groups and the plurality of users into a third set of groups based on the first score data associated with the plurality of users, wherein the number of groups in the second set of groups is equal to the number of distinct values in the first score data, and wherein the number of groups in the third set of groups is one group lesser than the second set of groups,
    (c) determine a sum of standard deviations of the first score data within each group of the second set of groups,
    (d) determine a sum of standard deviations of the first score data within each group of the third set of groups,
    (e) iteratively reduce the number of groups in each set of groups by one and repeat the steps (b)-(d) in each iteration until a difference between the sum of standard deviations for the second set of groups and the sum of standard deviations for the third set of groups is less than a first predefined threshold, and
    (f) when the difference between the sum of standard deviations for the second set of groups and the sum of standard deviations for the third set of groups is less than the first predefined threshold, selecting, by the server system, the number of groups in the first set of groups to be equal to the number of groups in the second set of groups.

13. The system as claimed in claim 8, wherein the system is caused to:
    obtain access data comprising data associated with the plurality of data objects and corresponding access information,
    wherein the access information indicates a set of users or groups, from the plurality of users or a plurality of groups, respectively, authorized to access each respective data object of the plurality of data objects, and
    wherein the access permission data for each of the plurality of users is determined based at least on the access data.

14. The system as claimed in claim 13, wherein the system is caused to:
    obtain user data comprising data associated with the plurality of users and the plurality of groups, wherein each of the plurality of users is associated with at least one group of the plurality of groups,
    wherein the user data specifies a group membership of each of the plurality of users and one or more of the plurality of groups, and
    wherein the access permission data for each of the plurality of users is determined further based on the user data.

15. A non-transitory computer-readable storage medium comprising computer-executable instructions that, when executed by at least a processor of a system, cause the system to perform a method comprising:
    determining, by a server system, access permission data for each of a plurality of users, the access permission data for each user indicating a set of data objects, among a plurality of data objects, accessible to the corresponding user, wherein each of the plurality of data objects corresponds to one of a plurality of categories;
    determining, by the server system, first score data for each user of the plurality of users based on the access permission data associated with each of the plurality of users, the first score data indicating a degree of closeness between the access permission data of the corresponding user and an expected access permission data of the corresponding user, wherein determining the first score data comprises:
        determining, by the server system, second score data for the corresponding user for each of the plurality of categories based on the access permission data, and
        determining, by the server system, the first score data for the corresponding user based at least on the determined second score data for each of the plurality of categories;
    computing, by the server system, a threshold value of the first score data defining a boundary value of first score data for identification of the anomalous users; and
    identifying, by the server system, a subset of users, among the plurality of users, as the anomalous users exhibiting overreaching access permission, wherein the first score data for each of the subset of users is equal to or below the computed threshold value.

* * * * *